(12) United States Patent
Borer et al.

(10) Patent No.: US 9,225,154 B2
(45) Date of Patent: Dec. 29, 2015

(54) ADHESIVE-BACKED COMMUNICATIONS MEDIA CABLING AND SYSTEM

(75) Inventors: Victor J. Borer, Austin, TX (US); William G. Allen, Austin, TX (US); Curtis L. Shoemaker, Round Rock, TX (US); Charles F. Staley, Austin, TX (US); Douglas B. Gundel, Cedar Park, TX (US); James G. Vana, Cedar Park, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 132 days.

(21) Appl. No.: 14/003,489

(22) PCT Filed: Feb. 29, 2012

(86) PCT No.: PCT/US2012/027058
§ 371 (c)(1),
(2), (4) Date: Sep. 6, 2013

(87) PCT Pub. No.: WO2012/125289
PCT Pub. Date: Sep. 20, 2012

(65) Prior Publication Data
US 2013/0341085 A1      Dec. 26, 2013

Related U.S. Application Data
(60) Provisional application No. 61/452,387, filed on Mar. 14, 2011.

(51) Int. Cl.
*H02G 3/04* (2006.01)
*H02G 3/08* (2006.01)
(Continued)

(52) U.S. Cl.
CPC .................. *H02G 3/04* (2013.01); *H02G 3/081* (2013.01); *H02G 3/266* (2013.01); *H02G 3/305* (2013.01)

(58) Field of Classification Search
CPC ......... H02G 3/04; H02G 3/081; H02G 3/266; H02G 3/305
USPC ....................................................... 174/70 C
See application file for complete search history.

(56) References Cited

U.S. PATENT DOCUMENTS

| 2,066,242 A | 12/1936 | Abbott |
| 4,454,374 A | 6/1984 | Pollack |

(Continued)

FOREIGN PATENT DOCUMENTS

| DE | 1188689 B | 3/1965 |
| DE | 1665801 A1 | 1/1971 |

(Continued)

OTHER PUBLICATIONS

International Search Report for PCT International Application No. PCT/US2012/027058, Mailed on Sep. 28, 2012, 3 pages.

(Continued)

*Primary Examiner* — Timothy Thompson
*Assistant Examiner* — Charles Pizzuto
(74) *Attorney, Agent, or Firm* — Gregg Rosenblatt (57) ABSTRACT

An adhesive-backed communications media cable includes a duct having a conduit portion with a lengthwise bore formed therein. The conduit portion includes an Ethernet over twisted pair communication line. The duct also includes a flange extending lengthwise with the conduit portion. An adhesive layer is disposed on a surface of the flange such that the duct is mountable to a mounting surface via the adhesive layer. A system for distributing multiple communications media lines in a living unit includes a multimedia receptacle mountable on a wall or mounting surface and an adhesive-backed communications media duct.

7 Claims, 8 Drawing Sheets

(51) Int. Cl.
*H02G 3/00* (2006.01)
*H02G 3/30* (2006.01)

(56) References Cited

U.S. PATENT DOCUMENTS

| | | | |
|---|---|---|---|
| 4,534,147 A | 8/1985 | Cristell | |
| 4,606,595 A | 8/1986 | Dola | |
| 5,514,834 A | 5/1996 | Zimmerman | |
| 5,886,295 A | 3/1999 | Carino | |
| 6,259,034 B1 | 7/2001 | Arthur | |
| 6,304,698 B1 | 10/2001 | Morris | |
| 6,541,089 B1 | 4/2003 | Hamerski | |
| 6,545,215 B2 | 4/2003 | Young | |
| 6,570,314 B2 | 5/2003 | Daimon | |
| 6,782,048 B2 | 8/2004 | Santhoff | |
| 7,035,511 B1 | 4/2006 | Rhoney | |
| 7,078,616 B2 | 7/2006 | Roesch | |
| 7,119,280 B1 | 10/2006 | Ray | |
| 7,369,738 B2 | 5/2008 | Larson | |
| 7,614,427 B2 | 11/2009 | McKane | |
| 7,868,760 B2 * | 1/2011 | Smith et al. | 340/572.1 |
| 7,946,031 B2 * | 5/2011 | Caveney | 29/828 |
| 8,050,527 B2 | 11/2011 | Noddings | |
| 2003/0049008 A1 | 3/2003 | Zeidan | |
| 2008/0047623 A1 * | 2/2008 | Chen et al. | 138/30 |
| 2008/0092470 A1 | 4/2008 | Jackson | |
| 2009/0247052 A1 | 10/2009 | Arisa | |
| 2009/0324188 A1 | 12/2009 | Berglund | |
| 2011/0030190 A1 | 2/2011 | Larson | |
| 2011/0030832 A1 | 2/2011 | Larson | |
| 2011/0065308 A1 * | 3/2011 | Lu et al. | 439/449 |

FOREIGN PATENT DOCUMENTS

| | | | |
|---|---|---|---|
| FR | 1304739 | * | 8/1962 |
| FR | 1304739 | | 9/1962 |
| FR | 2336773 A1 | | 7/1977 |
| FR | 2418973 | | 9/1979 |
| FR | 2568730 | | 2/1986 |
| JP | 05-015034 | | 1/1993 |
| JP | 09217889 | * | 8/1997 |
| RU | 2 271 074 C1 | | 2/2006 |
| WO | WO 93/14545 | | 7/1993 |
| WO | WO 2010-148157 | | 12/2010 |
| WO | WO 2010-148165 | | 12/2010 |
| WO | WO 2011-129972 | | 10/2011 |

OTHER PUBLICATIONS

Notice of Allowance for Russian Patent Appl. No. 2013138302, received on Apr. 28, 2015, 6 pp.

Supplementary EP Search Report for EP12757753, dated Aug. 6, 2015, 2 pp.

* cited by examiner

ADHESIVE-BACKED COMMUNICATIONS MEDIA CABLING AND SYSTEM

BACKGROUND OF THE INVENTION

1. Field of the Invention

The present invention is directed to adhesive-backed communications media cabling and a system distributing multiple communications media lines within a living unit of a multi-dwelling unit or home.

2. Background

Several hundred million multiple dwelling units (MDUs) exist globally, which are inhabited by about one third of the world's population. Due to the large concentration of tenants in one MDU, Fiber-to-the-X ("FTTX") deployments to these structures are more cost effective to service providers than deployments to single-family homes. Connecting existing MDUs to the FTTX network can often be difficult. Challenges can include gaining tenant approval, limited distribution space in riser closets, and space for cable routing. Specifically, FTTX deployments within existing structures make it difficult to route cables within the walls or floors, or above the ceiling from a central closet or stairwell, to each living unit.

Broadband deployments, including FTTH, are forcing the upgrade of in-home cabling due to the necessity to upgrade previously installed networking cables. In addition, further physical and aesthetic challenges exist in providing networking cables within each individual living unit. Also, because of their size, many conventional indoor optical network terminals (ONTs) are often placed in the closets of living units out of normal view. This type of arrangement requires that a service provider run new cabling (such as coaxial cables, cat 5 cables, and others) from the closet to the existing wiring in the living unit to activate the ONT to provide service. As newer ONTs have become smaller in physical size, they can be placed outside of closets and into main living areas.

SUMMARY

According to an exemplary aspect of the present invention, an adhesive-backed communications media cable includes a duct having a conduit portion with a lengthwise bore formed therein. The conduit portion includes an Ethernet over twisted pair communication line. The duct also includes a flange extending lengthwise with the conduit portion. An adhesive layer is disposed on a surface of the flange such that the duct is mountable to a mounting surface via the adhesive layer.

In another aspect, the conduit portion includes a USB line or an active optical USB line.

In another aspect, the conduit portion includes a high definition signal line, such as an HDMI line, an active optical HDMI line, and an active copper HDMI line.

According to another exemplary aspect of the present invention, a system for distributing multiple communications media lines in a living unit includes a multimedia receptacle mountable on a wall or mounting surface. The multimedia receptacle includes a base and a cover, the base being configured to receive multiple communications media lines. The communication media lines include a combination of different media, the different media including an optical fiber or fibers, an electrical wire, shielded wiring, a hybrid combination of an electrical wire and an optical fiber, an Ethernet over twisted pair communication line, and/or coaxial wiring. The system also includes an adhesive-backed communications media duct having a conduit portion with a lengthwise bore formed therein. The conduit portion includes a communications media line. The duct also includes a flange extending lengthwise with the conduit portion. An adhesive layer is disposed on a surface of the flange such that the duct is mountable to a mounting surface via the adhesive layer.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

As mentioned previously, broadband deployments, including FTTH, are forcing the upgrade of in-home cabling due to the necessity to upgrade previously installed networking cables. This deployment, along with the difficulty of fishing walls or battling congested conduits, requires that new pathways for communication media cables be created to link network terminals to peripheral equipment. Simplified, reduced labor methods of creating/installing this pathway significantly reduce the cost and complexity to install the higher value service(s). The present invention is directed to adhesive-backed communications media cabling and a system for distributing multiple communications media lines within a living unit of a multi-dwelling unit (MDU), home, or other structure such as a multiple tenant unit (MTU), school, hotel, hospital or other location. The term "living unit" is not limited to a domicile or residence, but can include an office, conference room, hotel room, hospital room, school room or other similar room, whether or not continuously occupied. The various system components described herein are designed to provide multimedia service within individual living units, such as residences, classrooms, or offices, within the building. The components of the system are also designed with very low impact profiles for better aesthetics within the living unit so that a communication and other electronics lines can be discretely mounted within the open space of a living unit. Adhesive-backed communications media cabling allows for cable placement and routing with a reduced or eliminated need for utilizing conventional fasteners, such as staples or screws. In addition, the adhesive-backed communications media cabling described herein can be routed within a living unit with reduced labor costs and complexity, as the need to fish cabling through walls is eliminated.

Figure 1A:
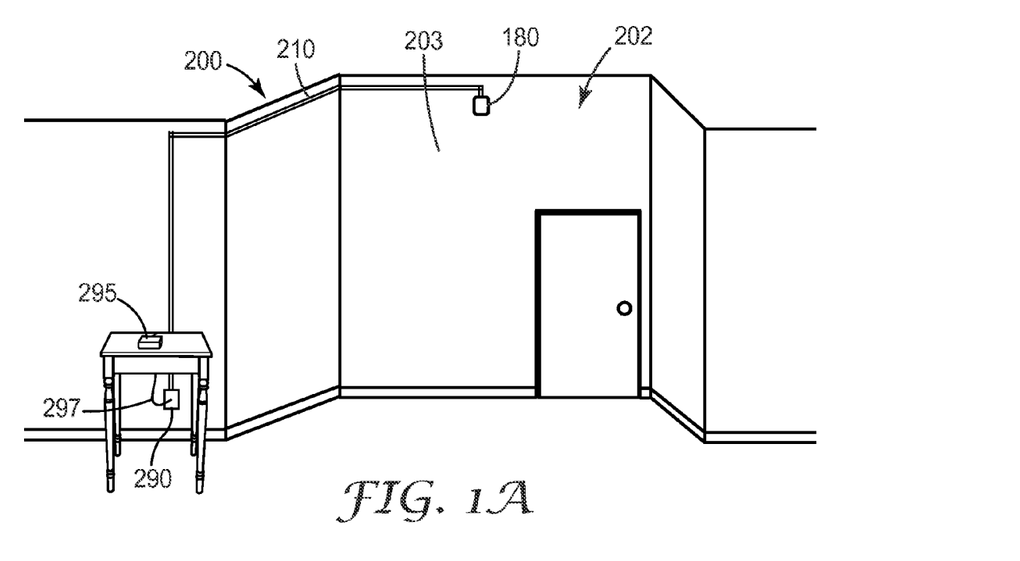
FIG. 1A is a schematic view of an exemplary final drop system according to an aspect of the present invention.
Figure 2:
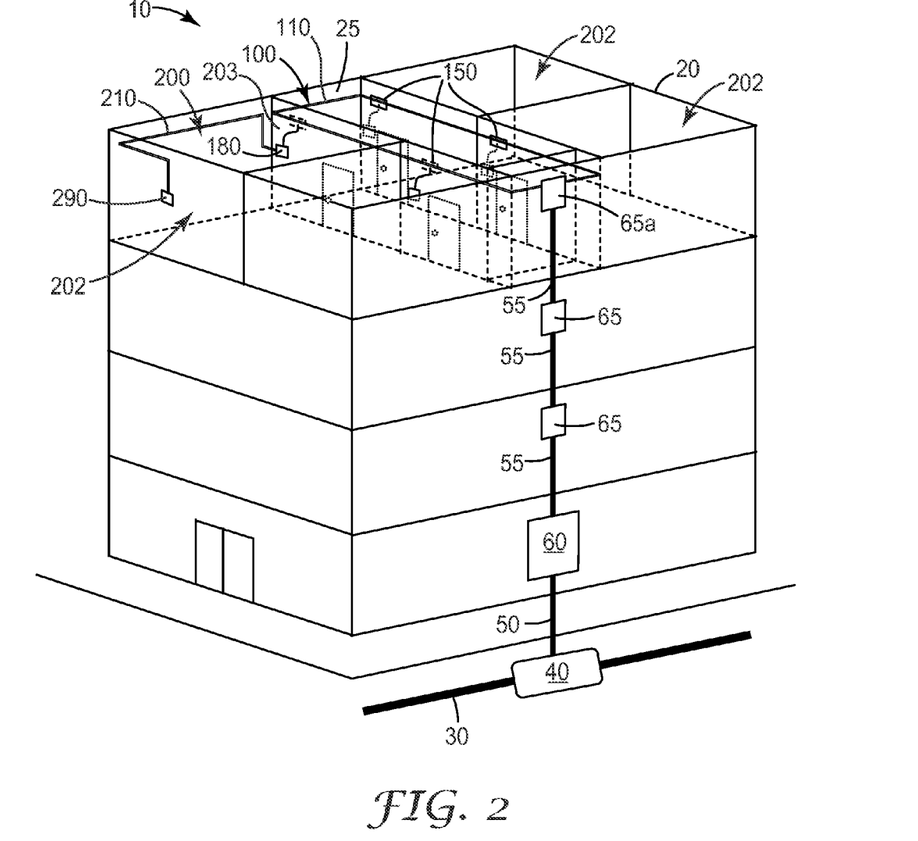
FIG. 2 is a schematic view of an exemplary MDU having a drop access location system and a final drop system according to an aspect of the present invention.

FIG. 1A shows a schematic view of a system 200 that includes a final drop that is installed in a living unit 202 of an exemplary building, such as MDU 10 (see FIG. 2). Please note that while system 200 is preferably utilized in a building such as an MDU, it may also be utilized in a single family home or similar residence, as would be apparent to one of ordinary skill in the art given the present description.

The system 200 includes a conduit or duct 210 which contains one or more communications lines (such as drop fibers or electrical drop lines, not shown in FIG. 1A) for connection with the horizontal cabling/service line(s) of the building, such as an MDU. The communications lines preferably comprise one or two optical fibers, although an electrical wire, coaxial/micro-coaxial cable, twisted pair cables, Ethernet cable, or a combination of these, may be used for data, video, and/or telephone signal transmission. In one aspect, a communications line can comprise a discrete (loose) drop fiber, such as 900 µm buffered fiber, 500 µm buffered fiber, 250 µm fiber, or other standard size communications fiber. The optical fiber can be single mode or multi-mode. Example multi-mode fibers can have a 50 µm core size, a 62.5 µm core size, an 80 µm core size, or a different standard core size. In another alternative aspect, the drop fiber can comprise a conventional plastic optical fiber. The final drop fiber(s) can be field terminated with an optical fiber connector, such as described in U.S. Pat. No. 7,369,738. Other optical fiber connectors, such as SC-APC, SC-UPC, or LC, can be utilized.

In addition, although the exemplary aspects described herein are often specific to accessing optical fiber lines, it would be understood by one of ordinary skill in the art given the present description that the system 200 can be configured to accommodate an electrical wire drop and/or a hybrid combination drop as well. For example, the electrical wire drop can comprise conventional Cat 5/Cat 6 wiring or conventional coax wiring, such as RG6 shielded and/or unshielded cables.

System 200 comprises one or more point-of-entry units located at one or more access location points within the living unit to provide access to the horizontal cabling provided within the MDU. In a preferred aspect, a point of entry unit comprises a low profile access base unit 180 (mountable over or onto at least a portion of the duct 210) that is located at an access location point. In an alternative aspect, the point of entry unit can comprise a funnel or other similar structure located at an access location point that provides an anchor point for the service line to enter the living unit.

In a preferred aspect, the service line point of entry can be established by disposing unit 180 on a living unit wall 203 as shown in FIG. 1A at an access position corresponding to horizontal cabling that is disposed in the hallway of the building. An exemplary drop access system and method of installing the horizontal cabling provided within the MDU is described in U.S. Patent Publication No. 2009-0324188, incorporated by reference herein in its entirety.

Figure 1B:
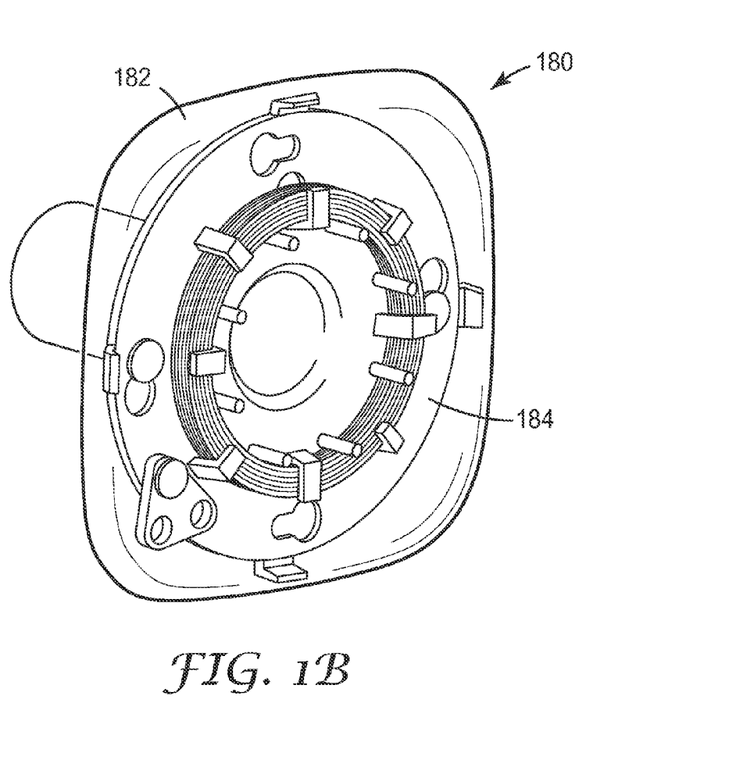
FIG. 1B is an isometric view of an exemplary low profile access base unit according to an aspect of the present invention.

As shown in FIG. 1B, an exemplary low profile access base unit 180 includes a cover 182 (shown as being transparent in the figure) and a wall-mounting portion 184. The cover 182 can have a low profile (with a circular, oval, rectangular, or other geometric outer shape) and/or decorative outer design for aesthetics within the living unit. The wall mounting portion 184 is located over the service fiber access point-of-entry within the living unit and provides structural support for the cover 182. The wall mounting portion includes a main port to fit over or into a hole formed in a wall 203 (see FIG. 1A) of the living unit 202 that leads to the service fiber(s) of the horizontal cabling. The wall mounting portion 184 can also provide a slack storage section formed along a perimeter portion of an outer facing surface thereof. This slack storage provides for storing excess amounts of the drop line. For example, a series of tabs or other structures disposed near or at a perimeter of the wall mounting portion 184 can be disposed thereon and can be configured to loosely secure excess fiber around the perimeter of the wall mounting portion. The fiber can be protected from over-bending by configuring the wall mounting portion to have a suitable radius or width. As an example, low profile access structure 180 can be designed as a low profile base unit for a drop fiber point of entry system, such as is described in the pending U.S. Patent Publication 2009-0247052, incorporated by reference herein in its entirety.

In one aspect, the drop line(s) (e.g., fiber(s)) can be coupled to the service provider line via a standard coupling located in a drop access box 150 (see FIG. 2) disposed in a hallway of the MDU. Alternatively, the drop line(s) can be coupled to the service provider line via a standard coupling located between the hallway wall and the interior wall 203 of the living unit, as is described in U.S. Patent Publication 2009-0247052, incorporated by reference above. In a further alternative, the low profile access base/point-of-entry unit 180 can include a standard coupling to couple the drop line(s) to the service provider line, such as when the service provider line is provided as a jumper from a central closet or similar location to the living unit or room.

The drop line(s), such as a terminated drop fiber(s), or other communication lines, can be carried from the point-of-entry unit, such as low profile access base unit 180, to a second anchor point within the living unit, in a preferred aspect, wall receptacle 290, via low profile duct 210. In a preferred aspect, the duct 210 is disposed along a wall, ceiling, under carpet, floor, or interior corner of the living unit in an unobtrusive manner, such that the aesthetics of the living unit are minimally impacted. Duct 210 can be configured as an adhesive-backed duct as is described in US Patent Publication No. 2011-0030190, incorporated by reference herein in its entirety.

As mentioned previously, system 200 includes a second anchor point at a distance from the point-of-entry to receive the drop line(s) and provide a connection with an optical network terminal (ONT) that is located within the living unit. In a preferred aspect, the second anchor point comprises a multimedia wall receptacle unit 290 (shown in more detail in FIGS. 4A-4D) that is configured to receive the drop line(s) (e.g., drop fiber(s) or drop wire(s)) and provide a connection with an ONT 295, such as a single family unit optical network terminal (SFU ONT), desktop ONT, or similar device (e.g., a 7342 Indoor Optical Terminal, available from Alcatel-Lucent or a Motorola ONT1120GE Desktop ONT).

Figure 3:
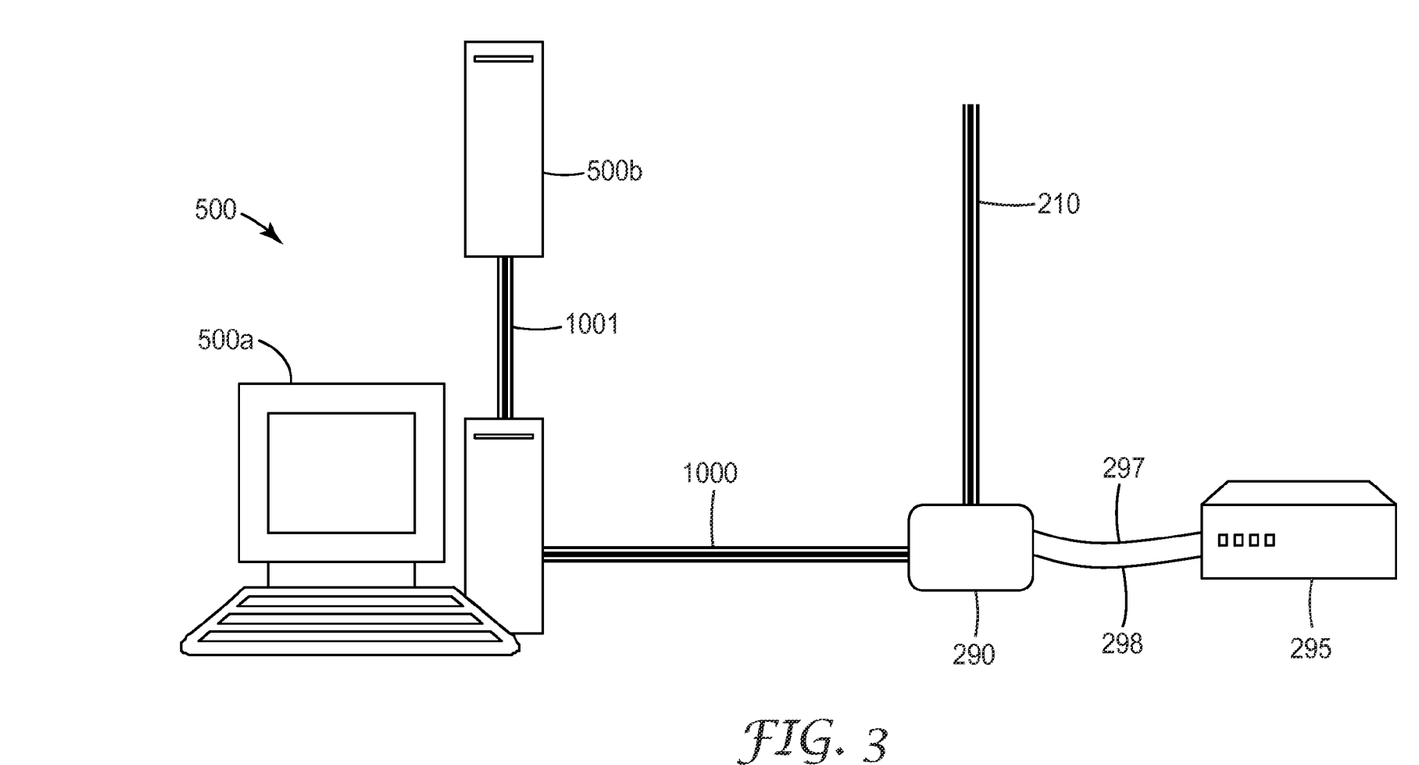
FIG. 3 is a schematic diagram of an exemplary communications media cabling system according to an aspect of the present invention.
Figure 5A:
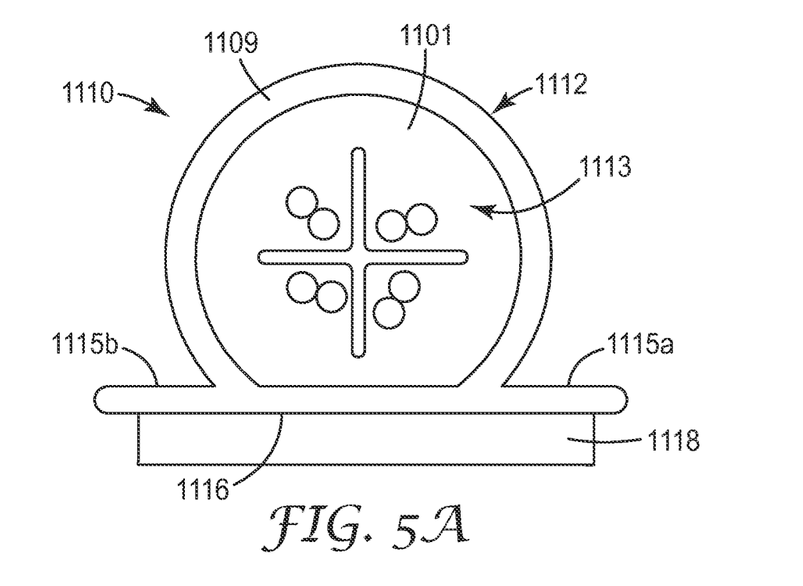
FIG. 5A is a schematic cross section view of a first exemplary duct according to another aspect of the invention.
Figure 5B:
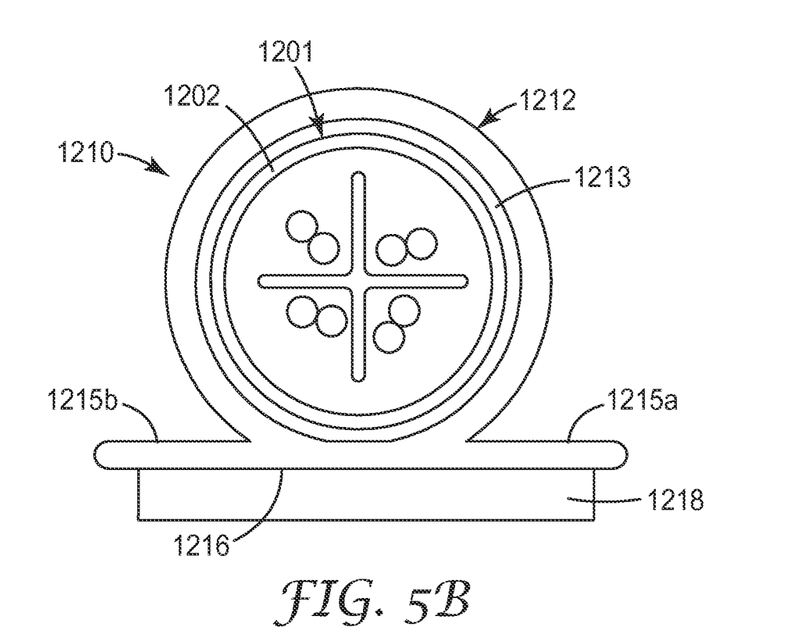
FIG. 5B is a schematic cross section view of another exemplary duct according to another aspect of the invention.
Figure 5C:
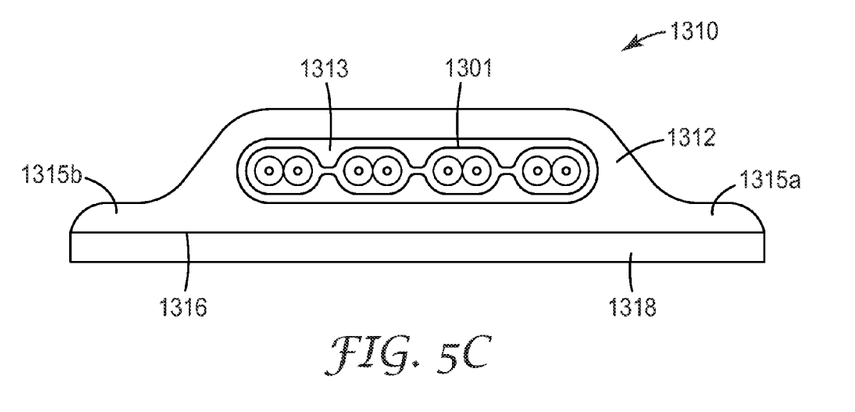
FIG. 5C is a schematic cross section view of another exemplary duct according to another aspect of the invention.
Figure 5D:
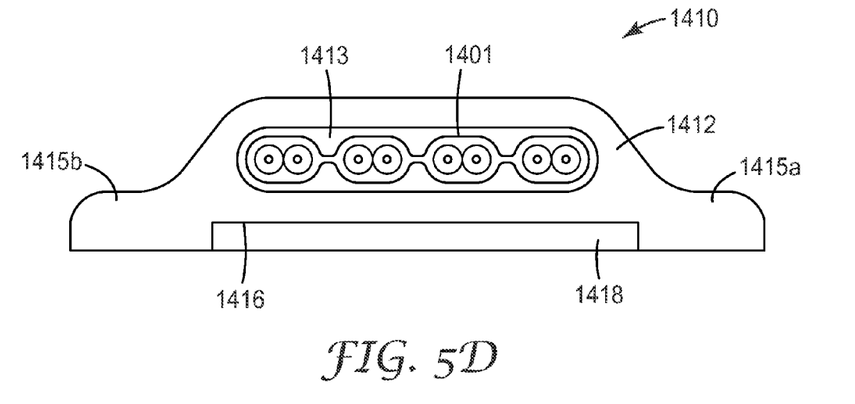
FIG. 5D is a schematic cross section view of another exemplary duct according to another aspect of the invention.

According to an exemplary aspect, the wall receptacle 290 is configured to distribute networking cables throughout the living unit. As such, wall receptacle 290 can be configured to provide multiple, multimedia connections, using, e.g., coaxial ground blocks or splitters, RJ11 adapters (such as couplers or jacks), RJ45 adapters (such as couplers or jacks), or fiber SC/APC adapters/connectors. As shown in FIG. 1A, fiber jumper 297 can connect to the ONT 295. As shown in FIG. 3, a metal-based jumper line 298 can also be utilized to couple signals from the ONT 295 back to the multimedia wall receptacle 290. In an exemplary aspect, a communications media duct 1000 can carry networking cable, such as an optical fiber or fibers, e.g., conventional optical fibers or plastic optical fiber. Communications media duct 1000 can also carry Ethernet over twisted pair wiring, commonly referred to as Category cables (e.g, Cat 5 and Cat 6 varieties). Exemplary ducts carrying Ethernet over twisted pair wiring are shown in FIGS. 5A and 5B. Communications media duct 1000 can also carry hybrid lines (e.g., a combination of electrical and fiber lines) or coaxial wiring, such as RG6 shielded and/or unshielded cables, or other shielded wiring such as described in International Publication Nos. WO 2010/148157 A2 and WO 2010/148165 A2, incorporated by reference herein in their entirety. Exemplary alternative ducts carrying shielded wiring are shown in FIGS. 5C and 5D. In addition, communications media duct 1000 can also carry high definition signal lines, such as HDMI, active optical HDMI, and active copper HDMI lines. Further, communications media duct 1000 can also carry computer communication lines such as USB and active optical USB lines. In a preferred aspect, communications media duct 1000 carries high speed Ethernet cabling—see, e.g., exemplary communications media ducts 1110, 1210, that are described in further detail with respect to FIGS. 5A and 5B. In addition, the communications media duct can be factory terminated with at least one connector or field terminated with at least one connector.

The adhesive-backed communications media duct 1000 can communicate with any peripheral equipment 500 in the living unit, such as a personal computer, television, set top box, Wi-Fi router or modem, femtocell, wireless antenna, security system, video surveillance system, gaming system, appliance, or similar device. In another aspect, the communications media duct can be used for point-to-point communications, e.g., connecting two peripherals to each other, such as peripheral 500a and peripheral 500b being connected via adhesive-backed communications media duct 1001, shown in FIG. 3.

In one aspect, the wall receptacle can be placed from just off the floor to about 10 inches, preferably about 8 inches, from the floor of the living unit.

In a further alternative aspect, the wall receptacle and the ONT can be combined in a single unit multimedia access box. In another alternative aspect, a structure such as wall receptacle 290 can be omitted, as the drop lines can be terminated and accessed from the duct 210 directly to the ONT 295.

Figure 4A:
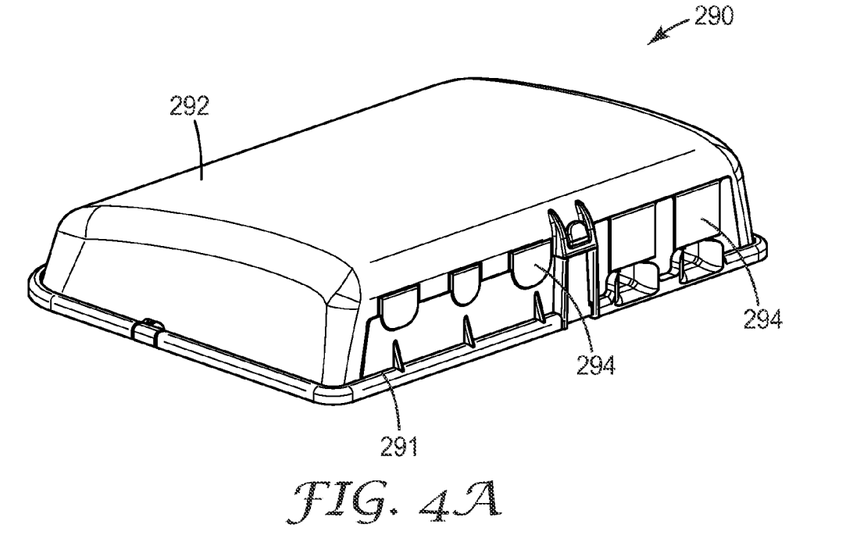
FIGS. 4A-4D are different views of a multimedia wall receptacle according to another aspect of the invention.
Figure 4B:
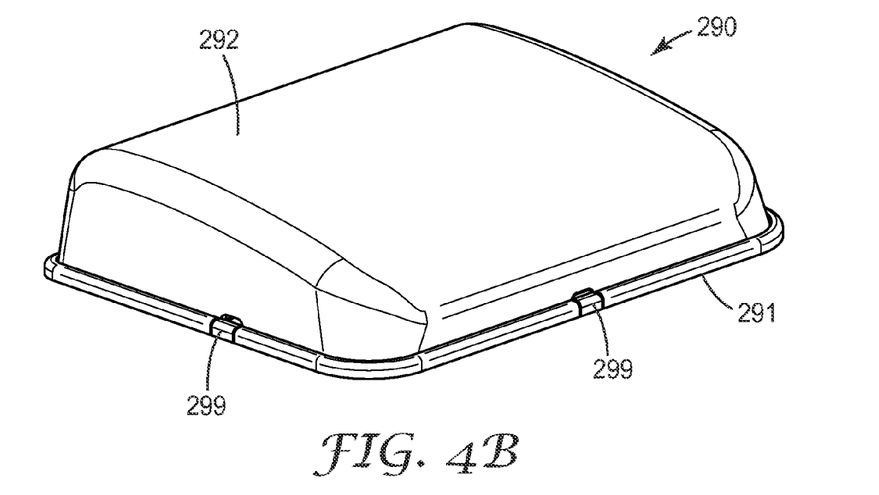
Figure 4C:
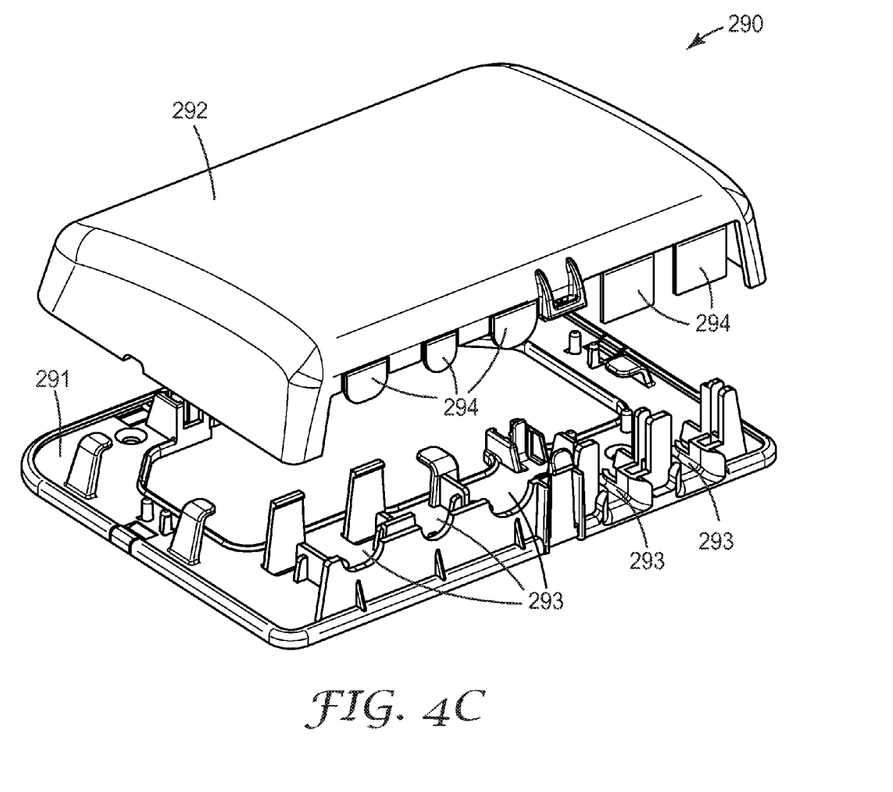
Figure 4D:
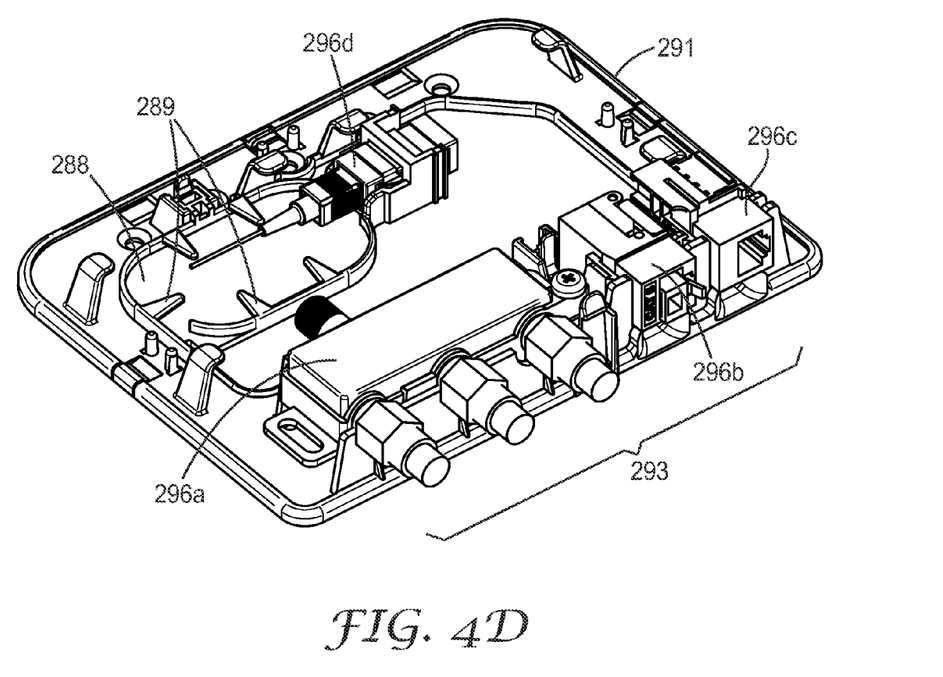

FIGS. 4A-4D show different views of exemplary multimedia wall receptacle 290. FIG. 4A is a front isometric view of multimedia wall receptacle 290, FIG. 4B is a rear isometric view of multimedia wall receptacle 290, FIG. 4C is an exploded view of multimedia wall receptacle 290, and FIG. 4D is an isometric view of the base portion of multimedia wall receptacle 290. In this exemplary aspect, wall receptacle 290 includes a base portion 291 and a cover 292. The cover 292 can be can be attached to base 291 via different types of attachment, such as friction fit, snap fit, latch fit, sliding fit, fastener, screw or hinged attachment. For example, in FIG. 4B, cover 292 can be attached via a snap fit with a snap latch element. Base 291 is preferably configured for flush mounting to a living unit wall, such as wall 203. Base 291 can also include an opening for mounting to a single or double wall box. Wall receptacle 290 can comprise a metal, plastic, or other suitably robust material, preferably having a low profile.

The multimedia wall receptacle 290 is configured to receive one or more drop lines and outgoing communications media cable/lines via multiple ports 293. In one exemplary aspect, the ports 293 can be accessed via snap off or break out port covers 294. In addition, side entry ports 299 can be provided for additional line access. These multiple ports provide for multiple connections with an ONT (see e.g., ONT 295) and with living unit electronic components 500. For example, as shown in FIG. 4D, base 291 can include several mounting structures or retention elements to allow ports 293 to be populated with multiple adapters (such as couplers or jacks), such as a coax adapter 296a (shown as a 1×3 coax splitter), RJ11 adapter 296b, and RJ45 adapter 296c. Alternatively, other types of adapters can be mounted in ports 293 to provide for multiple fiber, coaxial, or electrical connections. In addition, base 291 can include one or more internal mounting plates, such as plate 288, which can support additional adapters, such as a fiber SC/APC (or SC-UPC, LC, or MTP/MPO) adapter 296d, which can couple lines entering/exiting the side entry ports. Other conventional adapters, couplings and/or connectors can be utilized, as would be apparent to one of ordinary skill in the art given the present description. The wall receptacle 290 can further include a fiber slack storage section to route accessed fiber, if required. For example, as shown in FIG. 4D, plate 288 can include fiber retention structures 289 to permit fiber slack storage on plate 288.

FIG. 2 shows an example building, here MDU 10, with an exemplary drop access system to provide horizontal cabling to each individual living unit 202. MDU 10 is a multi-floor structure having a plurality of living units 202 located therein. For example, floor 20 has four living units having a common hallway 25. Feeder cable 30 brings communications lines to and from building 10. These feeder lines are spliced to the MDU's cabling system at a splice closure 40. The building feeder lines 50 are distributed to the building to a distribution hub (FDH) 60 in the building. Each floor includes a fiber distribution terminal (FDT) 65 that receives communications lines via riser cable 55. In the present example, a drop access system 100 coupling the communications lines from FDT 65a can be installed on hallway 25 such as is described U.S. Patent Publication No. 2009-0324188, incorporated by reference above, where drop access boxes 150 can be disposed outside each living unit and can receive one or more fiber optic communication lines from duct 110.

As also mentioned above, the drop access location system can be configured to accommodate electrical wire drops and hybrid combination drops as well. In alternative aspects, the drop access location system can be configured to supply at least one of uninterrupted DC power and AC power to the wall receptacle or an ONT located in an individual living unit.

In another exemplary aspect, a communications media duct 1110 is shown in FIG. 5A. Duct 1110 includes a conduit portion 1112 having a bore 1113 extending longitudinally therethrough. Duct 1110 is an elongated structure that may have a length (L) of up to several meters (depending on the application). The bore 1113 is sized to accommodate one or more communication lines disposed therein. In this aspect, the bore houses an Ethernet over twisted pair communications line, such as a CAT 5 or CAT 6 (or future CAT "X")—type line 1101, which may further include separators, foil, and/or other shielding elements. Further, in this aspect, the outer portion 1109 of conduit 1112 also serves as the jacket of the twisted pair communications line 1101.

While conduit portion 1112 can have a generally circular cross-section, in alternative embodiments it may have another shape, such as a rectangle, square, triangle, oval, other polygonal shaped, or flat ribbon cross-section. In one aspect, duct 1110 is a continuous structure formed from a polymeric material such as polyvinyl chloride (PVC), making it flexible, flame retardant and robust. In one aspect, duct 1110 can comprise an exemplary material such as a polyurethane elastomer, e.g., Elastollan 1185A10FHF. In one aspect, duct 1110 can comprise a polyolefin material that optionally includes one or more flame retardant additives. As such, duct 1110 can be guided and bent around corners and other structures without cracking or splitting. Duct 1110 can be continuously formed using a conventional extrusion process.

Duct 1110 also includes a flange or similar flattened portion to provide support for the duct 1110 as it is installed on or mounted to a wall or other mounting surface, such as a floor, ceiling, or molding. In most applications, the mounting surface is generally flat. The mounting surface may have texture or other structures formed thereon. In other applications, the mounting surface may have curvature, such as found with a pillar or column. The flange extends along the longitudinal axis of the duct. Exemplary duct 1110 includes a double flange structure, with flange portions 1115*a* and 1115*b*, positioned (in use) below the centrally positioned conduit portion. In an alternative aspect, the flange can include a single flange portion. In alternative applications, a portion of the flange can be removed for in-plane and out-of-plane bending.

In a preferred aspect, the flange 1115*a*, 1115*b* includes a rear or bottom surface 1116 that has a generally flat surface shape. This flat surface provides a suitable surface area for adhering the duct 1110 to a mounting surface, a wall or other surface (e.g., dry wall or other conventional building material) using an adhesive layer 1118. For example, in a preferred aspect of the present invention, the adhesive layer 1118 comprises a pressure sensitive adhesive, such as a transfer adhesive or double-sided tape, disposed on all or at least part of surface 1116. These types of adhesives do not exhibit macroscopic flow behavior upon application to a mounting surface and thus do not substantially change dimensions upon application to the mounting surface. In this manner, the aesthetic quality of the applied duct is maintained. Alternatively, adhesive backing 1118 can comprise an epoxy.

In one aspect, surface 1116 is backed with an adhesive layer 1118 having a removable liner. In use, the liner can be removed and the surface 1116 can be applied to a mounting surface via adhesive 1118. For example, an adhesive such as a factory applied 3M™ VHB™ Tape 4941F can be utilized as adhesive layer 1118. In other alternative aspects, adhesive layer 1118 comprises a repositionable adhesive or a removable adhesive, such as a stretch release adhesive. By "removable adhesive," it is meant that the duct 1110 can be mounted to a mounting surface (preferably, a generally flat surface, although some surface texture and/or curvature are contemplated) so that the duct 1110 remains in its mounted state until acted upon by an installer/user to remove the duct from its mounted position. Even though the duct is removable, the adhesive is suitable for those applications where the user intends for the duct to remain in place for an extended period of time. Suitable removable adhesives are described in more detail in International Publication No. WO 2011/129972, incorporated by reference herein in its entirety. Thus, high speed communications media cabling can be securely routed within the living unit without the need for using fasteners, such as staples and screws, as the adhesive backing allows for flush mounting to the wall or mounting surface, reducing clutter and improving the aesthetics of the installed cable.

In a further alternative aspect, an alternative duct 1210 is shown in FIG. 5B, which includes a conduit portion 1212 having a bore 1213 extending longitudinally therethrough. Duct 1210 is an elongated structure that may have a length (L) of up to several tens of meters (depending on the application). The bore 1213 is sized to accommodate one or more communication lines disposed therein. In this alternative aspect, the bore houses an Ethernet over twisted pair communications line, such as a CAT 5 or CAT 6 (or future CAT "X")—type line 1201, which may further include separators, foil, and/or other shielding elements. In this alternative aspect, the CAT 5 or CAT 6—type line 1201 includes an outer jacket 1202, such that the entire twisted pair cable is disposed within bore 1213. In a further alternative aspect, duct 1210 can include an HDMI-type cable, such as those described above, disposed within bore 1213. In an even further alternative aspect, duct 1210 can include a plastic optical fiber disposed within bore 1213.

In a further alternative aspect, duct 1210 can include an open top or slot that runs the longitudinal length of the duct to provide access for inserting or removing the line 1201. The slot can be formed during the extrusion process as a permanent slot or, alternatively, it can be formed in the factory or in the field using a cutting tool to provide a longitudinal opening in the duct. The tool can be applied to an empty duct or a duct that is pre-populated with one or more communication lines. In a further alternative, the slot may run only a portion of the longitudinal length of the duct 1210. In one aspect, the slot opening has a size of about 50% or less of the outer diameter of line 1201. In another aspect, the slot opening has a size of from about 10% to about 50% of the outer diameter of line 1201.

In a further alternative, duct 1210 can also include a strength member, such as an aramid string (e.g., a woven or non-woven Kevlar™ material) or aramid yarn that can be bonded or un-bonded, such as those described co-pending U.S. Pat. Publication Nos. 2011-0030190 and 2011-0030832, incorporated by reference herein in its entirety. The strength member can be disposed along the length of the duct between bottom surface 1216 and adhesive layer 1218 or within the conduit portion of the duct.

While conduit portion 1212 can have a generally circular cross-section, in alternative embodiments it may have another shape, such as a rectangle, square, triangle, oval, or other polygonal shaped cross-section. In one aspect, duct 1210 can be formed from the duct materials described above. As such, duct 1210 can be guided and bent around corners and other structures without cracking or splitting. Duct 1210 can be continuously formed using a conventional extrusion process.

Duct 1210 also includes a flange or similar flattened portion to provide support for the duct 1210 as it is installed on or mounted to a wall or other mounting surface, such as those described above. The flange extends along the longitudinal axis of the duct. Exemplary duct 1210 includes a double flange structure, with flange portions 1215*a* and 1215*b*, positioned (in use) below the centrally positioned conduit portion. In an alternative aspect, the flange can include a single flange portion. In alternative applications, a portion of the flange can be removed for in-plane and out-of-plane bending.

In a preferred aspect, the flange 1215*a*, 1215*b* includes a rear or bottom surface 1216 that has a generally flat surface shape. This flat surface provides a suitable surface area for adhering the duct 1210 to a mounting surface, a wall or other surface (e.g., dry wall or other conventional building material) using an adhesive layer 1218. The adhesive layer 1218 may comprise any of the adhesive materials described previously.

In another aspect, the conduit portion can include a strength member, such as Kevlar yarn.

In a further alternative aspect, an alternative duct 1310 is shown in FIG. 5C, which includes a conduit portion 1312 having a bore 1313 extending longitudinally therethrough. Duct 1310 is an elongated structure that may have a length (L) of up to several tens of meters (depending on the application). The bore 1313 is sized to accommodate one or more communication lines disposed therein. In this alternative aspect, the bore is oblong in shape to accommodate a flattened, shielded cabling structure 1301, such as is described in International Publication Nos. WO 2010/148157 A2 and WO 2010/148165 A2, incorporated by reference above. In this aspect, the shielded wiring has a conductor set of one or more substantially parallel conductors with two generally parallel shielding films disposed around the conductor set and bonded together.

In a further alternative, duct 1310 can also include a strength member, such as an aramid string (e.g., a woven or non-woven Kevlar™ material) or aramid yarn that can be bonded or un-bonded, such as those described co-pending U.S. Pat. Publication Nos. 2011-0030190 and 2011-0030832, incorporated by reference herein in its entirety. The strength member can be disposed along the length of the duct between bottom surface 1316 and adhesive layer 1318 or within the conduit portion of the duct.

Conduit portion 1312 can be formed from the duct materials described above. As such, duct 1310 can be guided and bent around corners and other structures without cracking or splitting. Duct 1310 can be continuously formed using a conventional extrusion process.

Duct 1310 also includes a flange or similar flattened portion to provide support for the duct 1310 as it is installed on or mounted to a wall or other mounting surface, such as those described above. The flange extends along the longitudinal axis of the duct. Exemplary duct 1310 includes a double flange structure, with flange portions 1315*a* and 1315*b*, positioned (in use) below the centrally positioned conduit portion. In an alternative aspect, the flange can include a single flange portion. In alternative applications, a portion of the flange can be removed for in-plane and out-of-plane bending.

In a preferred aspect, the edges of the flange 1315 can be tapered to provide a desired appearance against a wall or mounting surface, and to provide a smooth transition from the wall or mounting surface for facilitating painting over the duct.

In a preferred aspect, the flange 1315*a*, 1315*b* includes a rear or bottom surface 1316 that has a generally flat surface shape. This flat surface provides a suitable surface area for adhering the duct 1310 to a mounting surface, a wall or other surface (e.g., dry wall or other conventional building material) using an adhesive layer 1318. The adhesive layer 1318 may comprise any of the adhesive materials described previously. In a preferred aspect, adhesive layer 1318 comprises a stretch release adhesive. The stretch release adhesive layer 1318 can be applied in a continuous length along the flange, or in segments.

In yet a further alternative aspect, an alternative duct 1410 is shown in FIG. 5D, which includes a conduit portion 1412 having a bore 1413 extending longitudinally therethrough. Duct 1410 is an elongated structure that may have a length (L) of up to several tens of meters (depending on the application). The bore 1413 is sized to accommodate one or more communication lines disposed therein. In this alternative aspect, the bore is oblong in shape to accommodate a flattened, shielded cabling structure 1401, such as is described in International Publication Nos. WO 2010/148157 A2 and WO 2010/148165 A2, incorporated by reference above.

In a further alternative, duct 1410 can also include a strength member, such as an aramid string (e.g., a woven or non-woven Kevlar™ material) or aramid yarn that can be bonded or un-bonded, such as those described co-pending U.S. Pat. Publication Nos. 2011-0030190 and 2011-0030832, incorporated by reference herein in its entirety. The strength member can be disposed along the length of the duct between bottom surface 1416 and adhesive layer 1418 or within the conduit portion of the duct.

Conduit portion 1412 can be formed from the duct materials described above. As such, duct 1410 can be guided and bent around corners and other structures without cracking or splitting. Duct 1410 can be continuously formed using a conventional extrusion process.

Duct 1410 also includes a flange or similar flattened portion to provide support for the duct 1410 as it is installed on or mounted to a wall or other mounting surface, such as those described above. The flange extends along the longitudinal axis of the duct. Exemplary duct 1410 includes a double flange structure, with flange portions 1415*a* and 1415*b*, positioned (in use) below the centrally positioned conduit portion. In an alternative aspect, the flange can include a single flange portion. In alternative applications, a portion of the flange can be removed for in-plane and out-of-plane bending.

In a preferred aspect, the edges of the flange 1415 can be tapered to provide a desired appearance against a wall or mounting surface (e.g., by reducing shadows), and to provide a smooth transition from the wall or mounting surface for facilitating painting over the duct.

In this alternative aspect, the flange 1415*a*, 1415*b* includes a rear or bottom surface 1416 that has a generally flat surface shape and is formed as a channel between the flange end portions as is shown in FIG. 5D. This channel-shaped rear surface 1416 is configured to receive adhesive layer 1418 such that the duct 1410 can be flush mounted and adhered to a mounting surface, a wall or other surface (e.g., dry wall or other conventional building material). In this alternative aspect, the flange edges can contact the mounting surface when the duct is fully adhered to the mounting surface. The adhesive layer 1418 may comprise any of the adhesive materials described previously. In a preferred aspect, adhesive layer 1418 comprises a stretch release adhesive. The stretch release adhesive layer 1418 can be applied in a continuous length along the flange, or in segments.

In some aspects, these ducts can be installed in the living unit using an installation tool such as is described in U.S. Patent Publication No. 2009-0324188, incorporated by reference herein in its entirety.

While the ducts described herein are shown having a symmetrical shape, the duct designs can be modified to have an asymmetric shape (such as a flange wider on one side than the other), as would be apparent to one of skill in the art given the present description.

Moreover, the ducts described herein may be coextruded with at least two materials. A first material can exhibit properties that afford protection of the optical fibers within the conduit portion of each duct such as against accidental damage due to impact, compression, or even provide some protection against intentional misuse such as stapling. A second material can provide functional flexibility for cornering within a plane or provide more flame or smoke retardance. The flange portion of the duct may be extruded of a lower durometer material that allows it to be easily formed around a corner while maintaining a planar surface for secure bonding and wetting of the adhesive to the wall. The material forming the external wall near the conduits can provide a way for straightforward access such as making a window cut for accessing the fibers.

In a further alternative aspect, the ducts (e.g., duct 1210, 1310, 1410) can comprise an extruded polymer material, such as those described above, that is loaded with cut-up or chopped strength member (e.g., aramid) pieces to provide against excessive localized stretching during the application process.

The communications media cabling and system described herein can be utilized for providing all manner of cabling that may be required within a living unit or home. The system has a low profile and minimally impacts the aesthetics of the interior of the living unit, while providing protection for the communication lines from mechanical and environmental damage. The system further enables the move to smaller (e.g., desktop) ONTs.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A system for distributing multiple communications media lines in a living unit, comprising:
    a multimedia receptacle mountable on a wall or mounting surface, the multimedia receptacle including a base and a cover, the base being configured to receive multiple communications media lines, wherein the communication media lines include a combination of different media, the different media including at least one of an optical fiber, an electrical wire, shielded wiring, a hybrid combination of an electrical wire and an optical fiber, plastic optical fiber, an Ethernet over twisted pair communication line, and coaxial wiring; and
    an adhesive-backed communications media duct having a conduit portion with a lengthwise bore formed therein, the conduit portion including a communications media line, wherein the duct includes a flange extending lengthwise with the conduit portion and an adhesive layer disposed on a surface of the flange such that the duct is mountable to a mounting surface via the adhesive layer.

2. The system of claim 1, further comprising:
    a point-of-entry unit disposed within the living unit at a location corresponding to an access position of horizontal cabling; and
    an adhesive-backed duct having one or more communication drop lines disposed therein, mountable to a wall within the living unit to connect the point-of-entry unit to the multimedia receptacle.

3. The system of claim 1, further comprising an optical network terminal (ONT) coupled to the multimedia receptacle.

4. The system of claim 3, further comprising a first jumper and a second jumper connecting the multimedia receptacle to the ONT, wherein the first jumper comprises a fiber jumper and the second jumper comprises an electrical wire jumper.

5. The system of claim 3, wherein the at least one adhesive-backed communications media cable communicates peripheral equipment, the peripheral equipment comprising at least one of a personal computer, a television, a set top box, a Wi-Fi router or modem, a femtocell, a wireless antenna, a security system, a video surveillance system, a gaming system, and an appliance.

6. The system of claim 1, wherein the multimedia receptacle comprises a plurality of ports disposed in a rear portion of the multimedia receptacle.

7. An adhesive-backed communications media cable, comprising:
    a duct having a conduit portion with a lengthwise bore formed therein, the conduit portion including shielded wiring, where the shielded wiring has a conductor set of one or more substantially parallel conductors with two generally parallel shielding films disposed around the conductor set and bonded together;
    a flange extending lengthwise with the conduit portion; and
    an adhesive layer is disposed on a surface of the flange such that the duct is mountable to a mounting surface via the adhesive layer.

* * * * *